United States Patent [19]

Batten

[11] Patent Number: 5,271,853

[45] Date of Patent: Dec. 21, 1993

[54] INEXPENSIVE FLOW CONTROLLER

[75] Inventor: William C. Batten, Asheboro, N.C.

[73] Assignee: Thermaco, Inc., Asheboro, N.C.

[21] Appl. No.: 948,271

[22] Filed: Sep. 22, 1992

[51] Int. Cl.$^5$ .............................. C02F 1/40; F15D 1/00
[52] U.S. Cl. ...................................... 210/808; 137/1;
138/40; 138/44; 210/519
[58] Field of Search ................... 210/137, 519, 6, 808;
4/629, DIG. 4; 241/46.014; 138/44–46, 40;
99/646 LS; 137/1

[56] References Cited

U.S. PATENT DOCUMENTS

| | | | |
|---|---|---|---|
| 1,093,994 | 4/1914 | Kaibel | 210/519 |
| 1,199,266 | 9/1916 | Gram | 210/519 |
| 2,940,677 | 6/1960 | Jordan | 241/46.014 |
| 3,335,970 | 8/1967 | Hardy | 241/46.014 |
| 4,235,726 | 11/1980 | Shimko | 210/523 |
| 4,268,396 | 5/1981 | Lowe | 210/532.1 |
| 4,734,262 | 3/1988 | Bagshawe | 210/137 |
| 4,983,284 | 1/1991 | Batten | 210/187 |
| 5,133,881 | 7/1992 | Miller et al. | 210/776 |

Primary Examiner—Joseph W. Drodge
Attorney, Agent, or Firm—Rhodes, Coats and Bennett

[57] ABSTRACT

An apparatus for reducing liquid flow rates includes a chamber having peripheral walls, one of the walls having an aperture therein. A conduit connected to the chamber at the aperture forms a path from the conduit into the chamber. A 3/32" (0.24 cm) thick rubber sheet mounted to the apertured wall has a circular orifice therein aligned with but smaller than the aperture in the wall. A stainless steel plate affixed to an upper portion of the wall also has a hole aligned with the orifice and the aperture and serves to clamp the flexible membrane to the wall. Liquid passing from the conduit to the chamber has its flow rate reduced by passing through the orifice in the flexible membrane. The flexible membrane can be bowed inward of the chamber under increased upstream pressures to form an interior conical portion to direct any entrained solids from the conduit into the chamber.

16 Claims, 3 Drawing Sheets

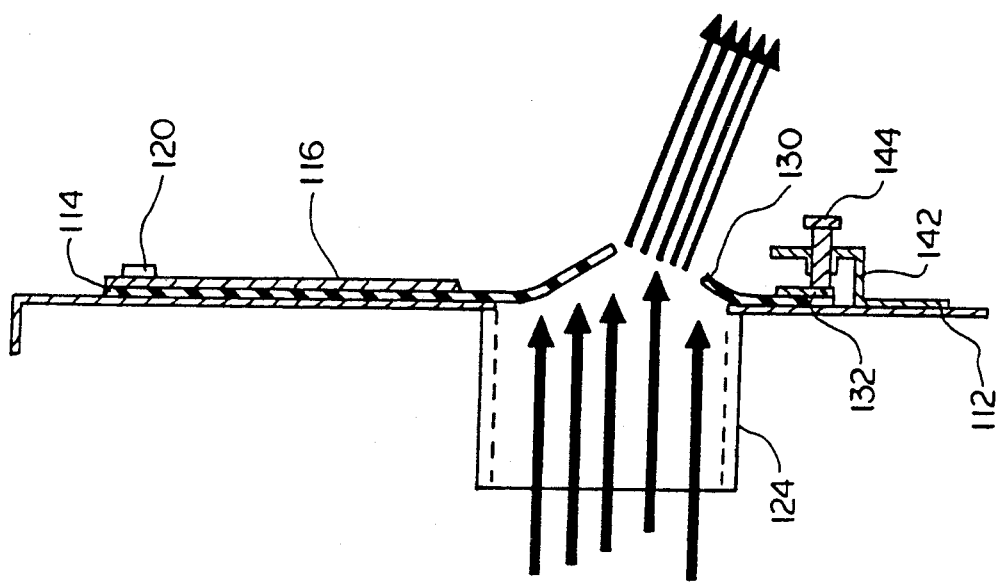

INEXPENSIVE FLOW CONTROLLER

BACKGROUND OF THE INVENTION

The present invention relates to improvements in inexpensive flow controllers, particularly adaptable for use in oil/grease separating devices. Oil/grease separating devices have been known for a number of years, and are commonly used in commercial kitchens to remove oil/grease components from the kitchen sink effluent. This permits recycling of the oil/grease components and reduces the expenses charged by sewage treatment authorities because of the decreased oil/grease content of the sewage. Various apparatuses of this type are known, including devices commercially sold by the assignee of the present invention, Thermaco, Inc. of Asheboro, N.C. under the trademark Big Dipper ®.

Exemplary patents of such devices include U.S. Pat. No. 4,235,726 to Shimko; U.S. Pat. No. 4,983,284 to Batten; U.S. Pat. No. 5,133,881 to Miller et al.; and U.S. Pat. No. 4,268,396 to Lowe. Those patents disclose various apparatuses for dealing with the removal of the oil/grease from the water effluent. All have in common the direction of the effluent to a container to permit the oil/grease to rise to the surface with various apparatuses being disclosed to remove the oil/grease floating on the surface of the water.

In order to provide standing time for the oil/grease to rise to the surface, the flow rate through the holding tank must be controlled. For example FIG. 15 of the Lowe patent shows a flow reducer in a coupling. The flow reducer is provided in the form of a copper insert which reduces the flow by about one-fourth. Other reducers known for these functions include a flat plate device. Both the conical and the flat plate devices have disadvantages. First, the conical inserts are expensive to fabricate and, typically being made of copper, result in a galvanic action with the other metallic components of the oil/grease dispenser, leading to corrosion. The flat metal plate orifices are prone to jamming by cylindrically shaped food solids, such as carrots. Thus, there is a need in the art for an improved, inexpensive flow controller, particularly for use with effluent which has entrained elongated or cylindrical solids.

SUMMARY OF THE INVENTION

The present invention fulfills this need in the art by providing an apparatus for reducing liquid flow rates including a chamber having peripheral walls, one of the walls having an aperture therein. A conduit connected to the chamber at the aperture forms a path from the conduit into the chamber. A flexible membrane mounted to the apertured wall has an orifice therein aligned with but smaller than the aperture in the wall. Liquid passing from the conduit to the chamber has its flow rate reduced by passing through the orifice in the flexible membrane, and the flexible membrane can be bowed inward of the chamber under increased upstream pressures to form an interior conical portion to direct any entrained solids from the conduit into the chamber.

In a preferred embodiment the flexible membrane is rubber. It is preferably a 3/32" (0.24 cm) thick rubber sheet. Preferably, the orifice is circular. In one embodiment it is circular and 0.75" (1.9 cm) in diameter. The orifice need not be concentric with the aperture, and, in fact, in some circumstances an offset is desirable. For example if the orifice is offset below the center of the aperture, the effluent flow is desirably directed downwardly, reducing shearing of the flow constituents.

In one embodiment, a plate affixed to the wall has a hole aligned with the orifice and the aperture serves to clamp the flexible membrane to the wall. Preferably, the plate is stainless steel, but is can also desirably be made of the same material as the wall. In a preferred embodiment the plate is affixed to only an upper portion of the wall. In addition, a clamp may be provided to clamp a lower portion of the plate to the wall.

The invention also provides a method of reducing flow rates of liquids having entrained solids. The method includes flowing the liquid and entrained solids from a conduit into a chamber through an aperture in a peripheral wall of the chamber and through an orifice in an flexible membrane mounted to the inside of the apertured wall, the orifice being aligned with but smaller than the aperture in the wall, such that the liquid has its flow rate reduced by passing through the orifice in the flexible membrane. The method includes bowing the flexible membrane inward of the chamber under increased upstream pressures to form an interior conical portion to direct any entrained solids from the conduit into the chamber.

The method is particularly well adapted to reducing flow rates of liquid kitchen effluent having entrained food solids including elongated food solids. This is so because elongated food solids have their elongated dimension oriented toward the orifice by the interior conical portion so that the elongated food solids can pass from the conduit into the chamber. Preferably, the bowing step includes bowing the flexible membrane downwardly to direct to flowing effluent downwardly into the chamber.

BRIEF DESCRIPTION OF THE DRAWINGS

The invention will be better understood from a reading of the Detailed Description of the Preferred Embodiment along with a study of the Drawings in which:

FIG. 4 is a view similar to the view of FIG. 2 of an alternate embodiment.

DETAILED DESCRIPTION OF A PREFERRED EMBODIMENT

Figure 1:
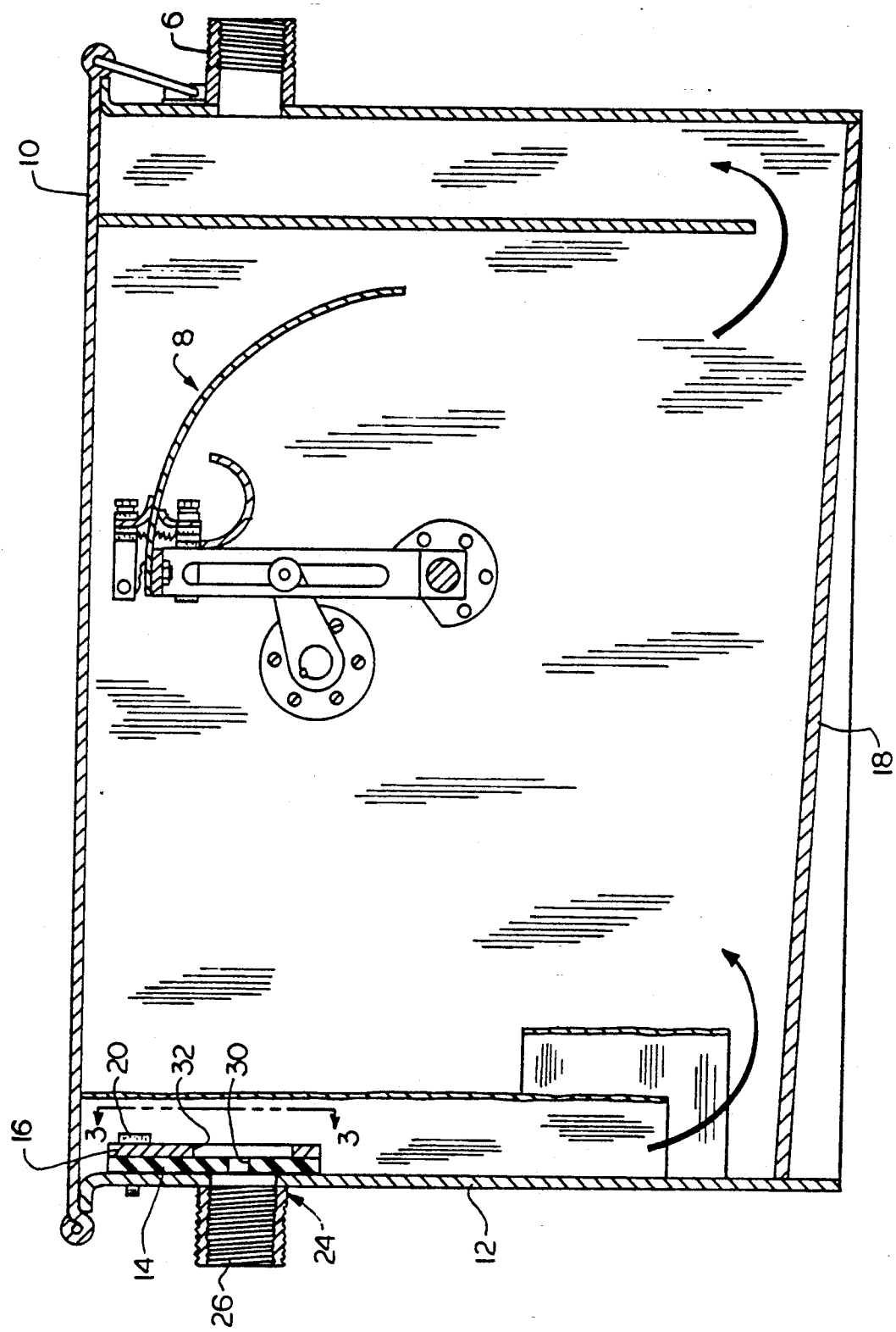
FIG. 1 is a side sectional view of an oil/grease separator equipped with the invention.

Referring now to FIG. 1, there is shown an oil/grease separating apparatus, such as the one shown in the aforementioned Shimko patent. The precise nature of the oil/grease separator is not important to this invention. Indeed, the invention is applicable to devices other than oil/grease separators.

The separator 10 includes an inlet coupling 26 having outer threads and an outlet coupling 6. Also provided is the oil/grease separating apparatus 8 not to be discussed in detail herein. The coupling 26 is formed in a peripheral wall 12 of the holding tank. Just downstream of the coupling in the wall 12 is a flexible membrane 14 having a hole 30 therein and aligned with the bore of the inlet 26. The flexible membrane is clamped in place by a cover plate 16, which is held in place by upper screws 20 passing through the wall 12. The plate 20 extends below the bore of the coupling 26 and has its own hole 32 slightly larger than the coupling inlet, and aligned with the hole 30 of the flexible membrane. Preferably, the flexible membrane is of an elastomeric material, such as 3/32" (0.24 cm) thick rubber. The mounting plate 16 is preferably a 16 gauge stainless steel plate with the hole 32 being 2¾" (7 cm) in diameter.

Figure 3:
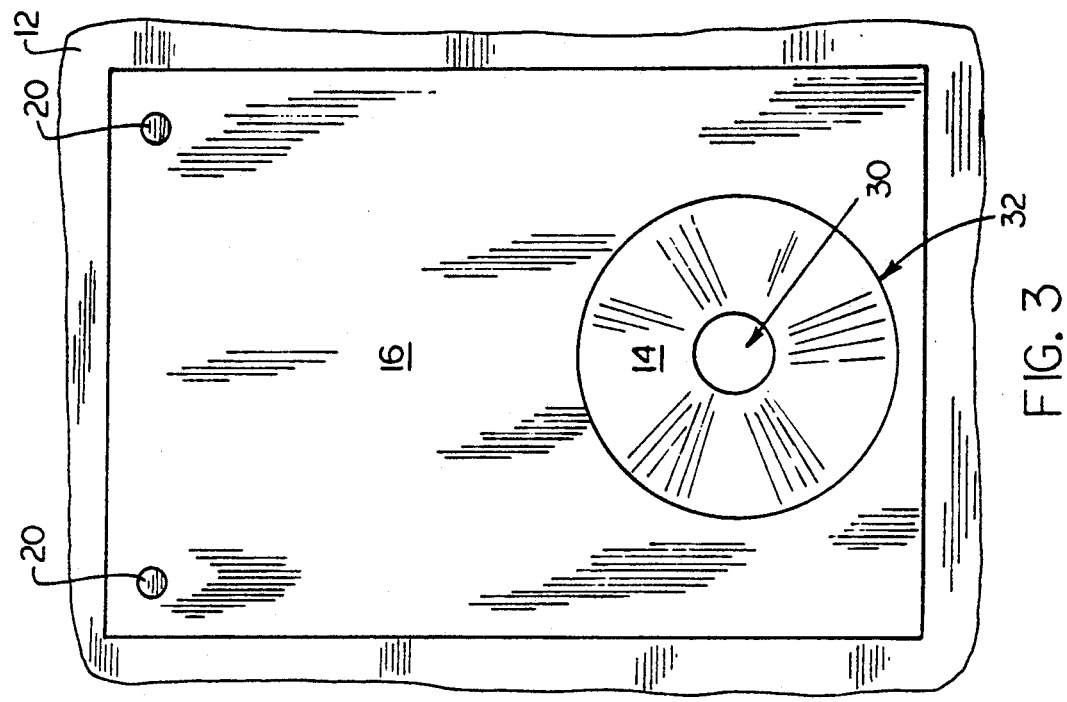
FIG. 3 is a view of the same portion taken along lines 3—3 of FIG. 1.

Referring now to FIG. 3, the alignment of the hole 32 in the stainless steel plate 16 with the round hole 30 in the rubber sheet can be seen. Also, as can be seen, the two screws 20 which hold the plate 16 in place are provided in the upper portion of the plate. This is for the purpose of making sure that it is above the static water line. Since the screws breach the wall 12, leaks will not occur should the screws become less than watertight.

Figure 2:
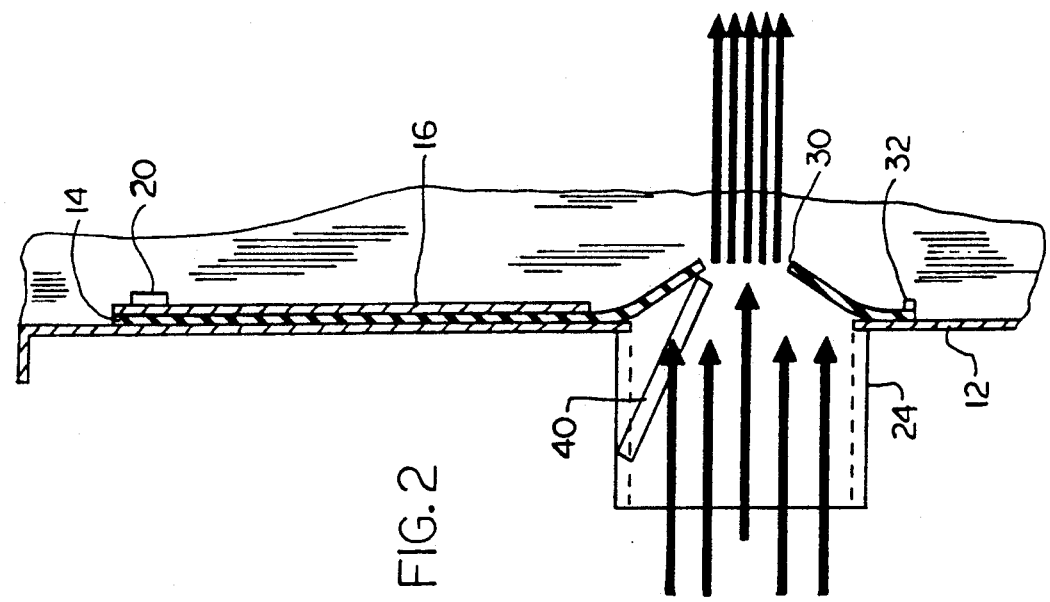
FIG. 2 is a view of a portion of the apparatus shown in FIG. 1 with full flow occurring.

In operation, water from a dishwasher or the like is passed through the inlet 26 and enters the holding tank 10. In normal flow, the liquid and small pieces of entrained solids pass without difficulty. However, should the supply's flow rate increase greatly, the rubber sheet 14 will hold back excessive flows. The increased upstream pressure resulting will bow the sheet 14 into the holding tank 10 as shown in FIG. 2. Also as shown in FIG. 2, if an elongated item such as a carrot 40 enters the inlet coupling 26, it will partially block the opening and restrict the flow further. This will result in a pressure buildup, causing the conical deformation of the rubber sheet. The conical shape of the sheet re-orients the carrot so that it passes into the holding tank, rather than continuing to be lodged across the opening.

The apparatus assures that a predetermined rate of flow will pass through the orifice for a given head pressure. While the rate of flow will increase if the head pressure increases, that does not occur in most instances. For example, for a Thermaco, Inc. Model W-200-IS unit installed in a basement location servicing a single three-compartment sink, that unit would come with a standard ¾" (1.9 cm) flow control orifice. That orifice will permit 20 gallons (0.076 cubic meters) per minute to flow at a head height of 1 meter. If the water height or pressure for the infeed to the device is expected to be greater, the hole 30 can be provided smaller. In this fashion, with a simple selection of the orifice diameter, the flow rate can be inexpensively and easily selected for any given head pressure and desired flow rate.

In addition, if any small debris does become lodged upstream of the rubber sheet, it can be easily removed by a small tool or finger.

FIG. 4 illustrates two possible modifications of the apparatus, both incorporated into one embodiment. In this embodiment the hole 130 is located in the sheet 114 so it is not concentric with the inlet 124, but rather offset in a direction of desired water deflection. That is, as can be seen in FIG. 4, the hole is lower than the center of the inlet 124 so that the water stream indicated by the arrows is deflected downward. This is particularly helpful in oil/grease separators because it directs the flow downward to reduce the shearing effect caused by excessive "splashing" and other turbulence as the flow enters the chamber. A conical shape is preserved with the top side of the cone bowing outward more than the bottom side.

FIG. 4 also shows an attachment clip 142, which helps to provide uniform pressure to hold the rubber sheet flat against the interior tank wall. The clip is preferably welded to the wall to avoid breaching the wall below the static water line. Bolts 144 are provided to permit adjustable pressure to be exerted on the lower portion 132 of the plate 116. The attachment clip 142 and the offset orifice 130 can be used independently of one another, if desired.

Those of ordinary skill in the art will appreciate that various other modifications to the embodiments specifically described herein can be made and yet fall within the scope of this invention. Those are deemed to be within the scope of the claims hereafter.

What is claimed is:

1. An apparatus for reducing liquid flow rates comprising
    a chamber including peripheral vertical walls, one of said walls having an aperture therein,
    a conduit connected to said chamber at said aperture to form an unobstructed path from said conduit into said chamber, and
    a planar flexible membrane mounted to said apertured wall in side said chamber and having an orifice therein aligned with but smaller than said aperture in said wall,
    whereby liquid passing from said conduit to said chamber has its flow rate reduced by passing through said orifice in said flexible membrane and said flexible membrane can be bowed inward of said chamber under increased upstream pressures to form an interior conical portion to direct any entrained solids from said conduit into said chamber.

2. An apparatus as claimed in claim 1 wherein said flexible membrane is rubber.

3. An apparatus as claimed in claim 1 further comprising a plate affixed to said apertured wall and having a hole aligned with said orifice and said aperture and serving to clamp said apertured flexible membrane to said wall.

4. An apparatus as claimed in claim 3 wherein said plate is stainless steel.

5. An apparatus as claimed in claim 3 wherein said plate is made of the same material as said apertured wall.

6. An apparatus as claimed in claim 3 wherein said plate is affixed to only an upper portion of said apertured wall.

7. An apparatus as claimed in claim 3 further comprising a clamp to clamp a lower portion of said plate to said apertured wall.

8. An apparatus as claimed in claim 1 wherein said flexible membrane is a 3/32" (0.24 cm) thick rubber sheet.

9. An apparatus as claimed in claim 1 wherein said orifice is circular.

10. An apparatus as claimed in claim 1 wherein said orifice is circular and 0.75" (1.9 cm) in diameter.

11. An apparatus as claimed in claim 1 wherein said orifice is not concentric with said aperture.

12. An apparatus as claimed in claim 1 wherein the center of said orifice is offset below the center of said aperture.

13. An apparatus for reducing liquid flow rates comprising
    a chamber including peripheral vertical walls, one of said walls having an aperture therein,
    a conduit connected to said chamber at said aperture to form a path from said conduit into said chamber,
    a 3/32" thick planar rubber sheet mounted to said apertured wall and having a circular orifice therein aligned with but smaller than said aperture in said wall, and a stainless steel plate affixed to an upper portion of said apertured wall and having a hole aligned with said orifice and said aperture and serving to clamp said flexible membrane to said apertured wall, whereby liquid passing from said conduit to said chamber has its flow rate reduced by passing through said orifice in said flexible membrane and said flexible membrane can be bowed inward of said chamber under increased upstream pressures to form an interior conical portion to direct any entrained solids from said conduit into said chamber.

14. A method of reducing flow rates of liquids having entrained solids comprising flowing the liquid and entrained solids from a conduit substantially horizontally into a chamber through an aperture in a peripheral wall of the chamber and through an orifice in a planar flexible membrane mounted to the inside of the apertured wall, the orifice being aligned with but smaller than the aperture in the wall, such that the liquid has its flow rate reduced by passing through the orifice in the flexible membrane, and bowing the flexible membrane inward of the chamber under increased upstream pressures to form an interior conical portion to direct any entrained solids from the conduit into the chamber.

15. A method of reducing flow rates of liquid kitchen effluent having entrained food solids including elongated food solids comprising flowing the effluent and entrained solids from a conduit substantially horizontally into a chamber through an aperture in a peripheral wall of the chamber and through an orifice in a planar, flexible membrane mounted to the inside of the apertured wall, the orifice being alinged with but smaller than the aperture in the wall, such that the effluent has its flow rate reduced by passing through the orifice in the flexible membrane, and bowing the flexible membrane into the chamber under increased upstream pressures to form an interior conical portion which aligns entrained elongated food solids to have their elongated dimension oriented toward the orifice so that the elongated food solids can pass from the conduit into the chamber.

16. A method as claimed in claim 15 wherein said bowing step comprises bowing the flexible membrane downwardly to direct flowing effluent downwardly into the chamber.

* * * * *